United States Patent
Choi (10) Patent No.: US 6,907,303 B2
(45) Date of Patent: Jun. 14, 2005

(54) SWITCHING CIRCUIT FOR BOARD DUPLICATION APPARATUS

(75) Inventor: Young Choi, Songnam-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 691 days.

(21) Appl. No.: 09/843,776

(22) Filed: Apr. 30, 2001

(65) Prior Publication Data

US 2002/0006113 A1 Jan. 17, 2002

(30) Foreign Application Priority Data

Jul. 6, 2000 (KR) ........................................ 2000-38563

(51) Int. Cl.[7] .............................................. G06F 13/00
(52) U.S. Cl. ........................ 700/82; 710/302; 713/600; 714/7
(58) Field of Search ........................... 700/82; 710/300, 710/301, 302; 713/322, 323, 600; 714/7; 370/241, 252; 325/354, 377

(56) References Cited

U.S. PATENT DOCUMENTS

| 5,508,910 | A | | 4/1996 | Diehl |
|---|---|---|---|---|
| 5,521,914 | A | | 5/1996 | Mavraganis et al. |
| 5,627,379 | A | | 5/1997 | Bortolini |
| 5,734,841 | A | * | 3/1998 | Shin et al. ................... 710/302 |
| 5,777,874 | A | | 7/1998 | Flood et al. |
| 6,144,669 | A | | 11/2000 | Williams et al. |
| 6,194,969 | B1 | | 2/2001 | Doblar |
| 6,393,081 | B1 | * | 5/2002 | Whetsel ....................... 375/354 |
| 6,477,605 | B1 | * | 11/2002 | Taki et al. ................... 710/302 |
| 6,564,279 | B1 | * | 5/2003 | Neil et al. ................... 710/302 |

FOREIGN PATENT DOCUMENTS

JP    2000172389    *  6/2000

* cited by examiner

Primary Examiner—Emanuel Todd Voeltz
(74) Attorney, Agent, or Firm—Robert E. Bushnell, Esq.

(57) ABSTRACT

There is provided a switching circuit for unit duplication boards designated as a working board and a protection board. In each duplication board, a software block is maintained reset at an initial hardware operation and determines the activation or deactivation state of a board according to a software command received from a central processing unit (CPU), a hardware block monitors a clock signal received from the other board using a system clock signal for the board and determines a time point when the system clock is to be activated according to the monitoring result, and a hardware board state block determines the working or protection state of the board in hardware terms, reflecting the states of the board and the other board during hardware operation. One of the unit duplication boards is automatically set to a working mode at an initial hardware operation, for hardware switching.

34 Claims, 5 Drawing Sheets

SWITCHING CIRCUIT FOR BOARD DUPLICATION APPARATUS

This application makes reference to, incorporates the same herein, and claims all benefits accruing under 35 U.S.C. §119 from an application entitled Unit Double Board Connection Circuit earlier filed in the Korean Industrial Property Office on 6 Jul. 2000, and there duly assigned Ser. No. 2000-38563 by that Office.

BACKGROUND OF THE INVENTION

1. Field of the Invention

The present invention relates generally to a communication system having a unit duplication function, and in particular, to a switching circuit for unit duplication boards, which accommodates both a hardware operation and a software operation for execution and switching of a working mode and a protection mode.

2. Description of the Background Art

Unit duplication boards may be designated as a working board or a protection board by commands generated from a central processing unit (CPU). The central processing unit transmits a working command to the working board and a protection command to the protection board.

The central processing unit senses signals such as a board fail signal and a demount signal and transmits new commands to the working board and protection board to set them to the working or protection mode. Therefore, clock inactivity lasts as long as the response time of the central processing unit, thereby decreasing system stability. If clock inactivity continues, the other peer regards this as loss of frame (LOF) and performs switching, decreasing system stability. Since most clock monitoring circuits use multivibrator chips, clock loss as great as a time constant of a resistor-capacitor circuit (RC) needed for monitoring occurs.

When the communication system is initially operated, a working board is designated by a software command only without using mutual monitoring signals in hardware terms. Without a central processing unit, it is impossible to operate the communication system in software terms. The resulting necessity of hardware operation has introduced alarm signals needed for mutual monitoring such as a demount signal, a signal indicative of the hardware active state of the other board, and signal loss.

Exemplars of the art are U.S. Pat. No. 6,194,969 B1 by Doblar, for System And Method for Providing Master And Slave Phase-aligned Clocks, U.S. Pat. No. 5,521,914 by Mavraganis et al., for Switched Access to Frame Relay, U.S. Pat. No. 5,777,874 by Flood et al., for Programmable Controller Backup System, U.S. Pat. No. 5,627,379 by Bortolini, for Duplication Detection of Circuit Board Removal Using Two Light Emitting Diodes, U.S. Pat. No. 6,144,669 by Williams et al., for Prioritized PVC Management Queues for Improved Frame Processing Capabilities, and U.S. Pat. No. 5,508,910 by Diehl, for Redundant Analog I/O Board System.

SUMMARY OF THE INVENTION

It is, therefore, an object of the present invention to provide a switching circuit for unit duplication boards, which operates stably by maintaining an error free state of a hardware path when a monitoring signal is added and a central processing unit board is inserted during hardware operation and adding alarms related with forced designation of a working board and board demounting to switching conditions.

It is another object of the present invention to provide a switching circuit for unit duplication boards, which additionally includes a clock monitoring circuit for monitoring the state of a clock signal when a board is demounted to prevent switching-caused clock inactivity.

It is still another object to have a reliable and efficient switching circuit for unit duplication boards that when power is applied, the slot for the particular board is automatically recognized by a reference signal and a corresponding board is set to a working mode.

It is still yet another object to have a reliable and efficient switching circuit for multiple boards according to the operation states of the boards and the clock signal used for switching.

To achieve the above and other objects, there is provided a switching circuit for unit duplication boards designated as a working board and a protection board. In each duplication board, a software block is maintained reset at an initial hardware operation and determines the activation or deactivation state of a board according to a software command received from a central processing unit, a hardware block monitors a clock signal received from the other board using a system clock signal for the board and determines a time point when the system clock is to be activated according to the monitoring result, and a hardware board state block determines the working or protection state of the board in hardware terms, reflecting the states of the board and the other board during hardware operation. One of the unit duplication boards is automatically set to a working mode at an initial hardware operation, for hardware switching.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
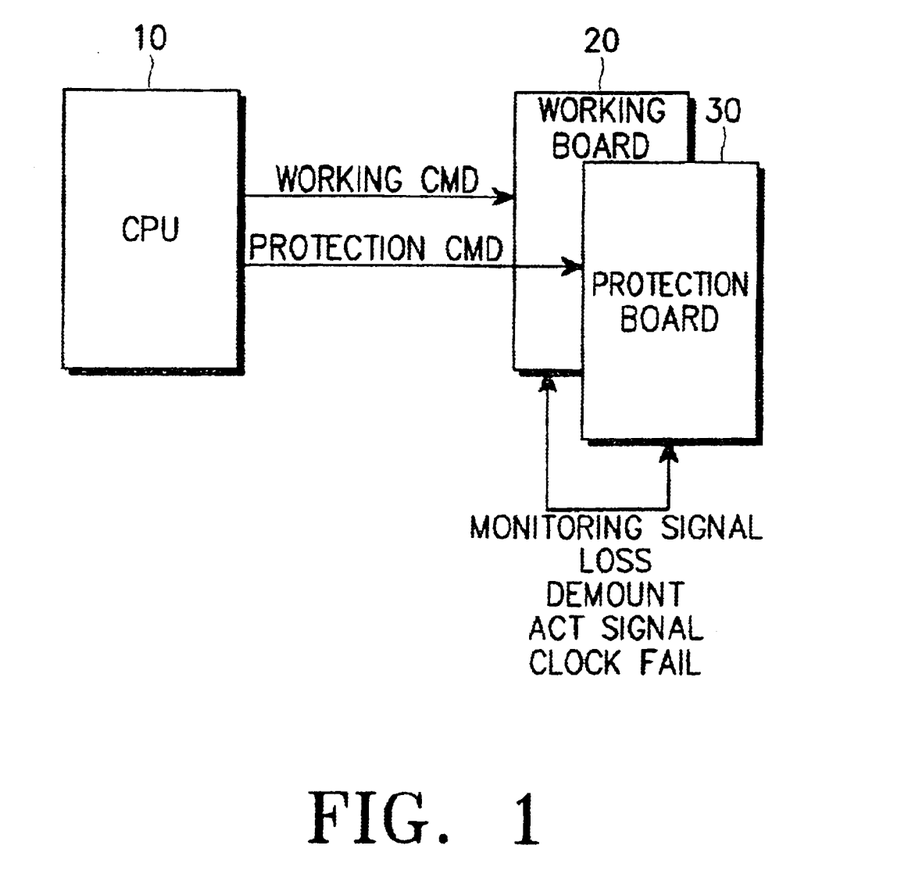
FIG. 1 is a block diagram of unit duplication boards, illustrating an earlier working and protection board operation and switching.

Turning now to the drawings, FIG. 1 is a schematic view illustrating unit duplication boards designated as a working board 20 or a protection board 30 by commands generated from a central processing unit 10. The central processing unit 10 transmits a working command (working CMD) to the working board 20 and a protection command (protection CMD) to the protection board 30.

The central processing unit 10 senses signals such as a board fail signal and a demount signal and transmits new commands to the working board 20 and protection board 30 to set them to the working or protection mode. Therefore, clock inactivity lasts as long as the response time of the central processing unit 10, thereby decreasing system stability. If clock inactivity continues, the other peer regards this as loss of frame (LOF) and performs switching, decreasing system stability. Since most clock monitoring circuits use multivibrator chips, clock loss as great as an RC time constant needed for monitoring occurs.

Figure 2:
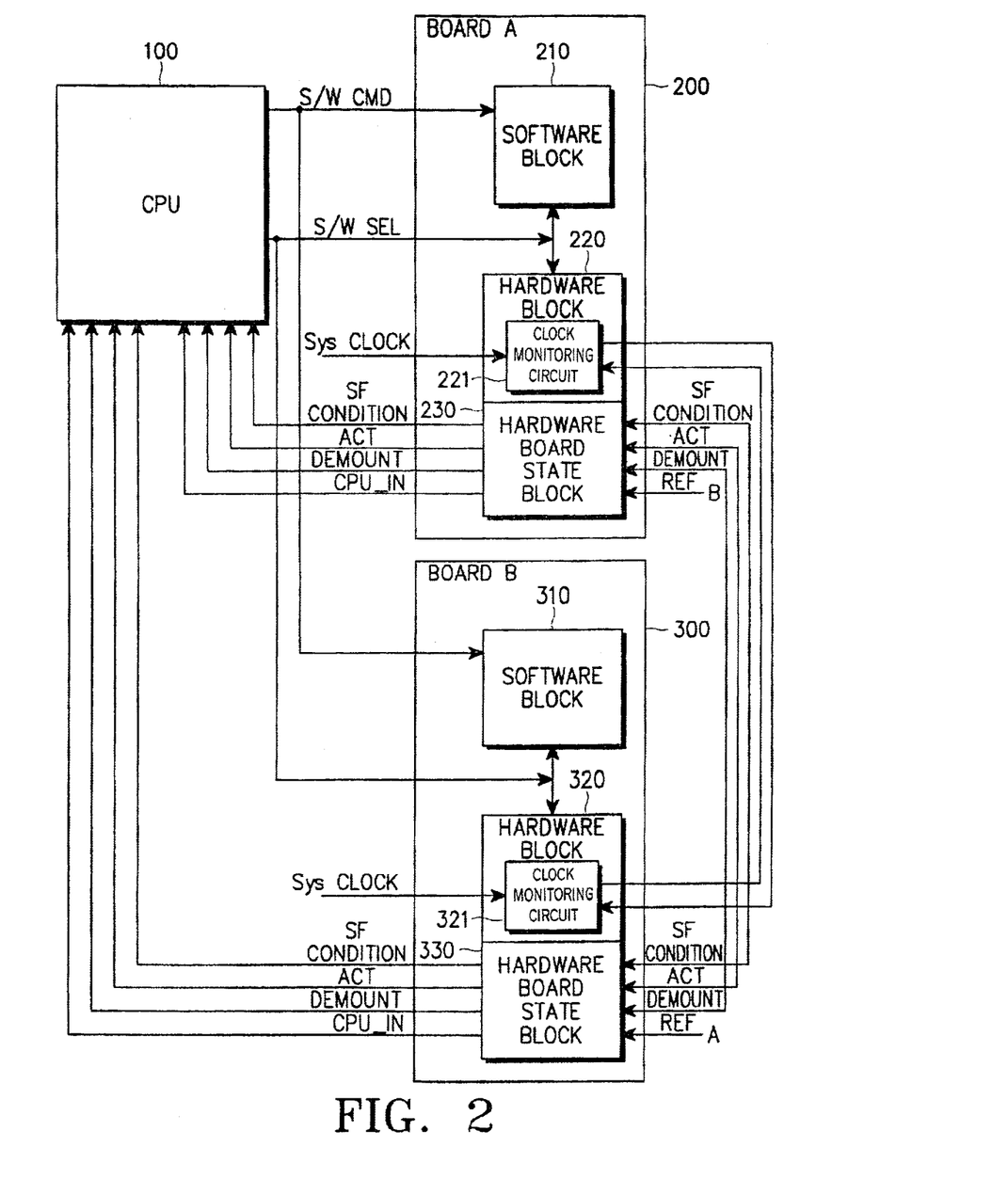
FIG. 2 is a block diagram of a working and protection board switching circuit according to an embodiment of the present invention.

Referring to FIG. 2, the duplication board A 200 has a software block 210, a hardware block 220, and a hardware board state block 230. The duplication board B 300 has a software block 310, a hardware block 320, and a hardware board state block 330. The hardware blocks 220 and 320 include clock monitoring circuits 221 and 321, respectively. The structure shown in FIG. 2 follows duplication standards as defined by Annex A of ITU-T Q.933 (International Telecommunication Union recommendation in the Telecommunication standardization sector) as switching criteria.

The software blocks 210 and 310 determine whether to activate or deactivate board A 200 and board B 300, respectively, according to a software command received from a central processing unit 100.

The clock monitoring circuit 221 determines a time point when a system clock signal for the duplication board A 200 is to be activated by monitoring a ½ divided signal of a clock signal (see FIG. 6) received from the other duplication board B 300 using the system clock signal, to thereby minimize clock inactivity involved in transition between activation and deactivation. Similarly, the clock monitoring circuit 321 determines a time point when a system clock signal for the duplication board B 300 is to be activated by monitoring a ½ divided signal of a clock signal received from the other duplication board A 200 using the system clock signal, to thereby minimize clock inactivity involved in transition between activation and deactivation.

The hardware board state block 230 or 330 determines the working or protection state of the respective duplication board A 200 or duplication board B 300 in hardware terms referring to the states of the two boards during hardware operation.

The central processing unit 100 determines the states of both duplication board A 200 and duplication board B 300. The central processing unit 100 determines the state of the duplication board A 200 based on signal fail conditions (SF conditions), activation signals (ACT), demount signals (DEMOUNT), signals CPU_IN received from the hardware board state block 230, and transmits software commands indicating activation or deactivation of the duplication board A 200 to the other duplication board B 300. Similarly, the central processing unit 100 determines the state of the duplication board B based on signal fail conditions (SF conditions), activation signals (ACT), demount signals (DEMOUNT), signals CPU_IN received from the hardware board state block 330, and transmits software commands indicating activation or deactivation of the duplication board B 300 to the other duplication board A 200. The demount signals concern the demounting of a particular board such as board A 200 or board B 300 from its respective slot A or slot B.

The hardware board state block 230 determines the state of the other duplication board B 300 by the signal fail condition, activation signal, demount signal, and reference signal received from the other duplication board B 300. The hardware board state block 330 determines the state of the other duplication board A 200 by the signal fail condition, activation signal, demount signal, and reference signal received from the other duplication board A 200.

The software block 210 or 310 is maintained reset during an initial hardware operation, that is, until the central processing unit 100 recognizes the insertion of each board and assigns an initial value to each board. That is, the software block 210 or 310 initially operates in a hardware mode.

To produce the same effects even though it is mounted without discrimination between slots A and B, each board must recognize its slot. For this purpose, it can be agreed in advance that a high reference signal is applied to slot A and a low reference signal to slot B. Then, the board initially operates according to the value of its reference signal. Slot A and slot B being the mountings for duplication board A 200 and duplication board B 300, respectively.

Figure 3:
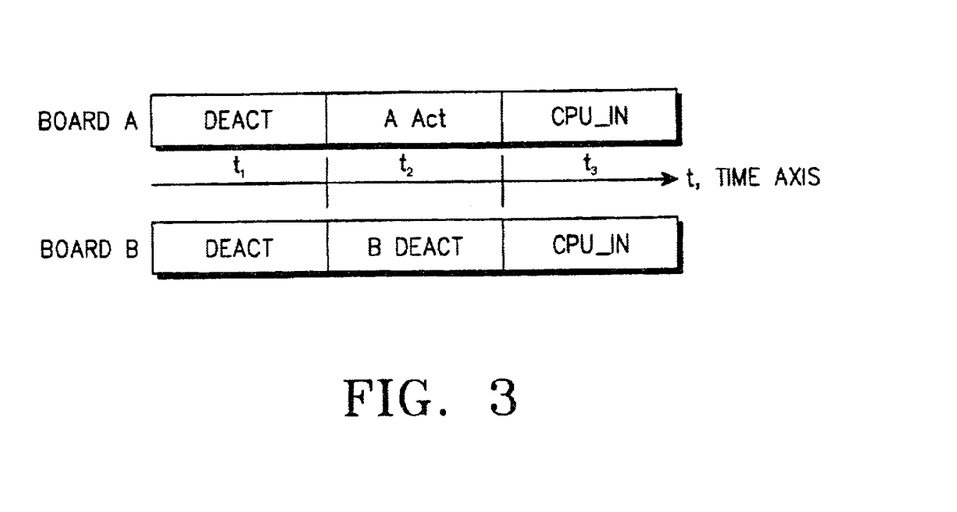
FIG. 3 illustrates the operational state of each board for reference time periods according to the embodiment of the present invention.
Figure 4:
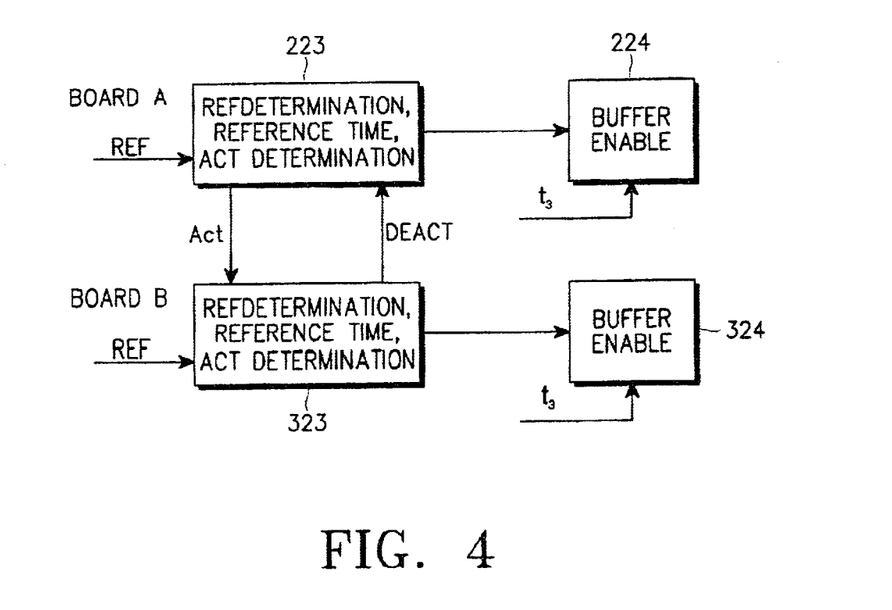
FIG. 4 is a block diagram illustrating a procedure of deciding the state of the other board according to a reference signal according to the embodiment of the present invention.

Each board counts a predetermined time according to an internal oscillator to set a reference time. This will be described referring to FIGS. 3 and 4. FIG. 3 illustrates the operational states of board A 200 and board B 300 for reference time periods according to the embodiment of the present invention and FIG. 4 is a block diagram illustrating determination of the states of board A 200 and board B 300 according to reference signals. Referring to FIG. 3, three reference time periods are set. For a reference time period $t_1$, both board A 200 and board B 300 are deactivated. For a second reference time period $t_2$, board A 200 is forced to be activated by a reference signal and notifies board B 300 of its activation state whereas board B 300 is forced to be deactivated and notifies board A 200 of its deactivation state to fully activate board A 200. For a third reference time period $t_3$, board A 200 and board B 300 notify the central processing unit 100 of their presence through signals CPU_IN. The central processing unit 100 can access board A 200 and board B 300 in software terms after $t_3$.

Figure 5:
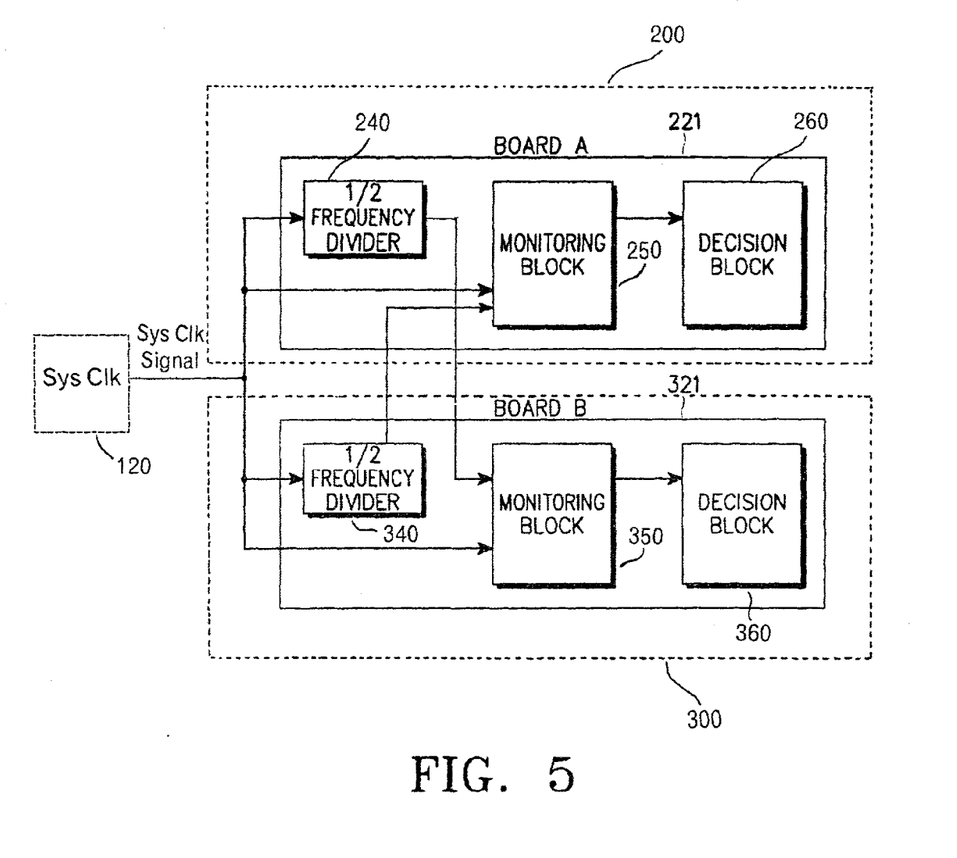
FIG. 5 is a detailed block diagram of a clock monitoring circuit for monitoring a clock signal received from the other board in a board according to the embodiment of the present invention.

FIG. 5 is a block diagram of the clock monitoring circuit 221 and 321. The clock monitoring circuit 221 of board A 200 and clock monitoring circuit 321 of board B 300 receive a system clock signal (Sys Clk signal) with the same phase. The clock monitoring circuit 221 of board A 200 activates the system clock 120 if it determines that the other board B 300 experiences clock failure or is demounted based on the result of monitoring a clock signal received from the other board B 300, thereby minimizing clock inactivity. The clock monitoring circuit 321 of board B 300 activates the system clock 120 if it determines that the other board A 200 experiences clock failure or is demounted based on the result of monitoring a clock signal received from the other board A 200, thereby also minimizing clock inactivity.

Figure 6:
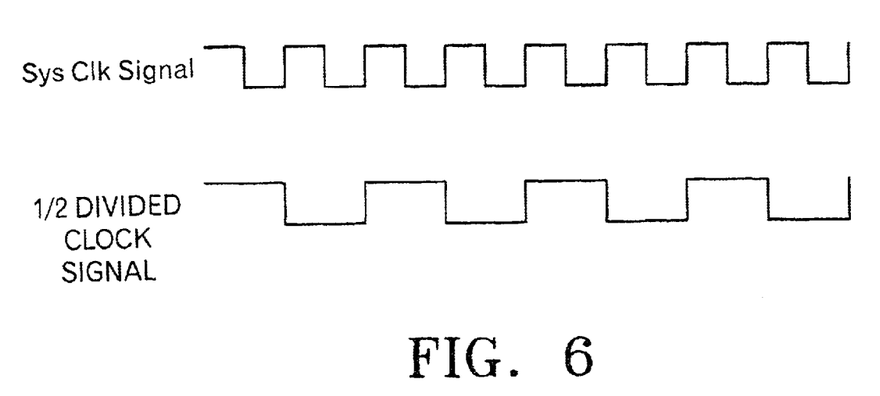
FIG. 6 is a timing diagram of a system clock signal and a ½ divided signal of a clock signal received from the other board for use in the clock monitoring circuit according to the embodiment of the present invention.

Specifically, the clock monitoring circuit 221 and 321 receive a system clock signal with the same phase as shown in FIGS. 5 and 6. The clock monitoring circuit 221 of board A 200 divides the frequency of the system clock signal by 2 through a ½ frequency divider 240 and provides the ½ divided clock signal to the monitoring block 350 of the clock monitoring circuit 321 of the other board B 300 for monitoring. The monitoring block 350 also receives the system clock signal for the board B 300. The monitoring block 350 of the board B 300 outputs the system clock signal of the board B 300 and the ½ divided clock signal of the other board A 200 to a decision block 360. The decision block 360 of the clock monitoring circuit in board B 300 monitors the state of the other board A 200 according to the received clock signals. The decision block 360 is used for determining the demounting of the other board A 200 from its respective slot or the clock failure of the other board A 200 based on the output of the monitoring block 350. Similarly, the clock monitoring circuit 321 of board B 300 divides the frequency of the system clock signal by 2 through a ½ frequency divider 340 and provides the ½ divided clock signal to the monitoring block 250 of the clock monitoring circuit 221 of the other board A 200 for monitoring. The monitoring block 250 also receives the system clock signal for the board A 200. The monitoring block 250 of the board A 200 outputs the system clock signal of the board A 200 and the ½ divided clock signal of the other board B 300 to a decision block 260. The decision block 260 of the clock monitoring circuit in board A 200 monitors the state of the other board B 300 according to the received clock signals. The decision block 260 is used for determining the demounting of the other board B 300 from its respective slot or the clock failure of the other board B 300 based on the output of the monitoring block 250.

Figure 7:
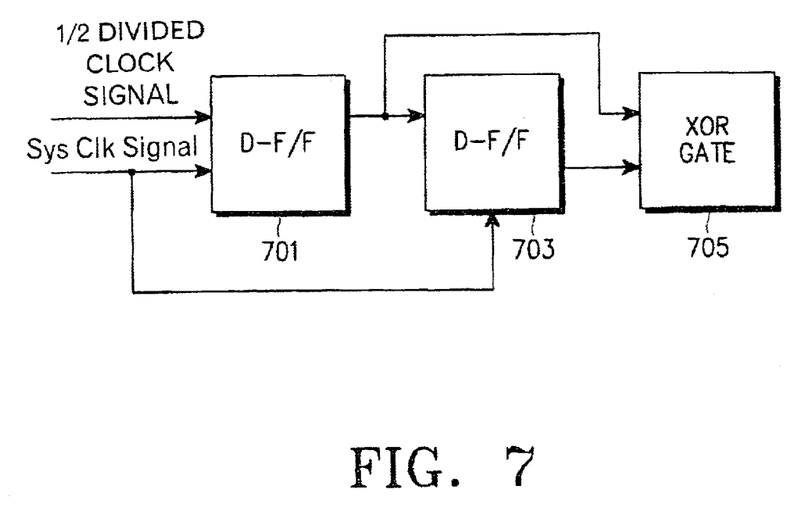
FIG. 7 is a block diagram of a decision block for monitoring the state of the other board by the clock signal received from the other board according to the embodiment of the present invention.

FIG. 7 is a block diagram of the decision block 260 or 360 of the clock monitoring circuit 221 or 321, respectively. For the input of the ½ divided clock signal and its system clock signal, D flip-flops (D-F/Fs) 701 and 703 alternately output 0 and 1. As a result, an XOR gate 705 receives clock signals with different phases and thus its output is normally maintained at a high level. In the case that due to failure of the received ½ divided clock signal or demounting of the other board, the clock signal is high or low, identical signals are applied to the input of the XOR gate 705. Therefore, the output of the XOR gate 705 is low, indicating clock fail or board demounting. In this manner, each board can recognize the state of the other board.

For example, in the decision block 260 of board A 200, the ½ divided clock signal of board B 300 and the system clock signal of board A 200 are inputted into the D flip-flop 701. The output of the D flip-flop 701 is inputted into the D flip-flop 703 and the exclusive OR gate (XOR) 705. The D flip-flop 703 also receives the system clock signal of board A 200. The XOR gate 705 also receives the output of the D flip-flop 703. From the ½ divided clock signal of board B 300 and the system clock signal of board A 200, the D flip-flops 701 and 703 alternatively output 0 and 1. Consequently, the exclusive OR gate 705 receives clock signal with different phases and thus its output is normally maintained high. In the case that due to failure of the received ½ divided clock signal or demounting of the other board B 300, the clock signal is high or low, identical signals are applied to the input of the exclusive OR gate 705 of board A 200. Therefore, the output of the exclusive OR gate 705 is low, indicating clock failure or that the board B 300 is demounted. In this manner, board A 200 can recognize the state of the other board B 300.

As described above, a switching circuit for unit duplication boards according to the present invention has the advantages that when power is applied, slot A is automatically recognized by a reference signal and a corresponding board is set to a working mode, satisfying Annex A of ITU-T Q.933. Another advantage is that a path can be checked in hardware without software operation and hardware switching can be performed. Still another advantage is since a working or protection mode or both a working and detection mode is set by detecting clock fail and board demounting within two clock pulses, board stability after switching can be increased.

While the invention has been shown and described with reference to a certain preferred embodiments thereof, it will be understood by those skilled in the art that various changes in form and details may be made therein without departing from the spirit and scope of the invention as defined by the appended claims.

What is claimed is:

1. An apparatus, comprising:
   a first unit; and
   a second unit, one of said first unit or second unit automatically set to a working mode or a protection mode at an initial operation accommodating switching, said second unit comprising:
   a first block being maintained reset at an initial operation and determining the activation or deactivation state of said second unit according to a command received from a central processing unit;
   a second block monitoring a clock signal received from said first unit using a system clock signal for said second unit and determining a time point when said system clock is to be activated according to the monitoring result; and
   a third block determining the working or protection state of said second unit, reflecting the states of said second unit and said first unit.

2. The apparatus of claim 1, with said first unit and said second unit being unit duplication boards.

3. The apparatus of claim 1, with said first block being a software block, said second block being a hardware block, and said third block being a hardware board state block.

4. The apparatus of claim 1, with said third block of said second unit being set to the working mode according to a reference signal when at the initial operation and maintaining activation, notifies said third block of said first unit of the activation state, and a third block of said first unit duplication board maintained deactivated notifies said third block of said second unit being in the working mode of the deactivation state of said first unit, said third block of said first unit determining the working or protection state of said first unit.

5. The apparatus of claim 4, with after the automatic setting of said second unit to the working mode, each one of said first and second unit notifying said central processing unit of the presence of said first and second unit so said central processing unit can access said first and second unit.

6. The apparatus of claim 5, with said second block of said second unit including a clock monitoring circuit determining demounting and clock fail of said first unit by directly monitoring a clock signal received from said first unit.

7. The apparatus of claim 1, with said first unit comprising:
   a first block being maintained reset at an initial hardware operation and determining the activation or deactivation state of said first unit according to a command received from said central processing unit;
   a second block monitoring a clock signal received from said second unit using a system clock signal for said first unit and determining a time point when said system clock is to be activated according to the monitoring result; and
   a third block determining the working or protection state of said first unit, reflecting the states of said first unit and said second unit during operation.

8. The apparatus of claim 7, with said second block of said first unit including a clock monitoring circuit determining demounting and clock fail of said second unit by directly monitoring a clock signal received from said second unit.

9. The apparatus of claim 8, with said clock monitoring circuits in each one of said first and second units, comprising:
- a ½ frequency divider receiving a system clock signal with the same phase for both said first and second units, dividing the frequency of the received system clock signal by 2, and transmitting the ½ divided clock signal to the other one of said first or second units, accommodating monitoring;
- a monitoring block outputting the system clock signal of one of said first or second units and a ½ divided clock signal of the other one of said first or second units; and
- a decision block determining demounting or clock fail of the other one of said first or second units based on the output of said monitoring block.

10. The apparatus of claim 6, with said clock monitoring circuit in said second unit duplication board comprising:
- a ½ frequency divider receiving a system clock signal with the same phase as that of a system clock signal for said first unit, dividing the frequency of the received system clock signal by 2, and transmitting the ½ divided clock signal to said first unit, accommodating monitoring;
- a monitoring block outputting the system clock signal of said second unit and a ½ divided clock signal of said first unit; and
- a decision block determining demounting or clock fail of said first unit based on the output of said monitoring block.

11. The apparatus of claim 8, with said clock monitoring circuit in said first unit duplication board comprising:
- a ½ frequency divider receiving a system clock signal with the same phase as of a system clock signal for said second unit, dividing the frequency of the received system clock signal by 2, and transmitting the ½ divided clock signal to said second unit, accommodating monitoring;
- a monitoring block outputting the system clock signal of said first unit and a ½ divided clock signal of said second unit; and
- a decision block determining demounting or clock fail of said second unit based on the output of said monitoring block.

12. The apparatus of claim 1, with said first unit comprising:
- a first block being maintained reset at an initial hardware operation and determining the activation or deactivation state of said first unit according to a software command received from said central processing unit;
- a second block monitoring a clock signal received from said second unit using a system clock signal for said first unit and determining a time point when said system clock is to be activated according to the monitoring result; and
- a third block determining the working or protection state of said first unit, reflecting the states of said first unit and said second unit during operation.

13. The apparatus of claim 10, with said decision block of said second unit comprising of:
- a first part receiving an input of the ½ divided clock signal of said first unit, the clock signal of said second unit, and outputting the state of the ½ divided clock signal when the clock signal is applied;
- a second part receiving the output from said first part and a clock signal of said second unit, said second part outputting the state of the output from said first part when the clock signal of said second unit is applied; and
- a third part outputting a boolean operation of nonequivalence of the output received from said second part and the output from said first part.

14. The apparatus of claim 13, with said first part and second part being D flip-flops and the third part being an exclusive OR gate.

15. A switching circuit for unit duplication boards, comprising:
- a first unit duplication board; and
- a second unit duplication board, one of said first unit duplication board or second duplication board automatically set to a working mode at an initial hardware operation accommodating hardware switching, said second unit duplication board, comprising:
- a software block being maintained reset at an initial hardware operation and determining the activation or deactivation state of said second unit duplication board according to a software command received from a central processing unit;
- a hardware block monitoring a clock signal received from said first unit duplication board using a system clock signal for said second unit duplication board and determining a time point when said system clock is to be activated according to the monitoring result; and
- a hardware board state block determining the working or protection state of said second unit duplication board in hardware terms, reflecting the states of said second unit duplication board and said first unit duplication board during hardware operation.

16. The switching circuit of claim 15, with said hardware board state block of said second unit duplication board being set to the working mode according to a reference signal when at the initial hardware operation and maintaining activation, notifies said hardware board state block of said first unit duplication board of the activation state, and a hardware board state block of said first unit duplication board maintained deactivated notifying said hardware board state block of the working said second unit duplication board of the deactivation state.

17. The switching circuit of claim 16, with after the automatic setting of said second unit duplication board to the working mode, each one of said first and second unit duplication board notifying said central processing unit of the presence of said first and second unit duplication board so said central processing unit can access said first and second unit duplication boards in software terms.

18. The switching circuit of claim 17, with said hardware block of said second unit duplication board including a clock monitoring circuit determining demounting and clock fail of said first unit duplication board by directly monitoring a clock signal received from said first unit duplication board.

19. The switching circuit of claim 18, with said first unit duplication board comprising:
- a software block being maintained reset at an initial hardware operation and determining the activation or deactivation state of said first unit duplication board according to a software command received from said central processing unit;
- a hardware block monitoring a clock signal received from said second unit duplication board using a system clock signal for said first unit duplication board and determining a time point when said system clock is to be activated according to the monitoring result; and a hardware board state block determining the working or protection state of said first unit duplication board in hardware terms, reflecting the states of said first unit duplication board and said second unit duplication board during hardware operation.

20. The switching circuit of claim 18, with said hardware block of said first unit duplication board including a clock monitoring circuit determining demounting and clock fail of said second unit duplication board by directly monitoring a clock signal received from said second unit duplication board.

21. The switching circuit of claim 20, with said clock monitoring circuits in each one of said first and second unit duplication board, comprising:

a ½ frequency divider receiving a system clock signal with the same phase as that of a system clock signal for the other one of said first or second unit duplication board, dividing the frequency of the received system clock signal by 2, and transmitting the ½ divided clock signal to the other one of said first or second unit duplication board, accommodating monitoring;

a monitoring block outputting the system clock signal of one of said first or second unit duplication board and a ½ divided clock signal of the other one of said first or second unit duplication board; and a decision block determining demounting or clock fail of the other one of said first or second unit duplication board based on the output of said monitoring block.

22. The switching circuit of claim 18, with said clock monitoring circuit in said second unit duplication board comprising:

a ½ frequency divider receiving a system clock signal with the same phase as that of a system clock signal for said first unit duplication board, dividing the frequency of the received system clock signal by 2, and transmitting the ½ divided clock signal to said first unit duplication board, accommodating monitoring;

a monitoring block outputting the system clock signal of said second unit duplication board and a ½ divided clock signal of said first unit duplication board; and a decision block determining demounting or clock fail of said first unit duplication board based on the output of said monitoring block.

23. The switching circuit of claim 20, with said clock monitoring circuit in said first unit duplication board comprising:

a ½ frequency divider receiving a system clock signal with the same phase as of a system clock signal for said second unit duplication board, dividing the frequency of the received system clock signal by 2, and transmitting the ½ divided clock signal to said second unit duplication board, accommodating monitoring;

a monitoring block outputting the system clock signal of said first unit duplication board and a ½ divided clock signal of said second unit duplication board; and a decision block determining demounting or clock fail of said second unit duplication board based on the output of said monitoring block.

24. The switching circuit of claim 15, with said first unit duplication board comprising:

a software block being maintained reset at an initial hardware operation and determining the activation or deactivation state of said first unit duplication board according to a software command received from said central processing unit;

a hardware block monitoring a clock signal received from said second unit duplication board using a system clock signal for said first unit duplication board and determining a time point when said system clock is to be activated according to the monitoring result; and a hardware board state block determining the working or protection state of said first unit duplication board in hardware terms, reflecting the states of said first unit duplication board and said second unit duplication board during hardware operation.

25. The switching circuit of claim 21, with said decision block comprising of:

a first part having a data input, a trigger, and an output having the state of the data input when the trigger is received, said first part receiving the ½ divided clock signal of said first unit duplication board and the clock signal of said second unit duplication board;

a second part having a data input, a trigger, and an output having the state of the data input when the trigger is received, said second part receiving the output from said first part and a clock signal of said second unit duplication board; and a third part outputting a boolean operation of nonequivalence of an output received from said second part and the output from said first part.

26. The switching circuit of claim 25, with said first part and second part being D flip-flops and the third part being an exclusive OR gate.

27. A method, comprising:

automatically setting one of a first unit or second unit to a working mode at an initial hardware operation accommodating hardware switching;

maintaining a reset at an initial operation and determining the activation or deactivation state of a first unit according to a software command received from a central processing unit;

monitoring a clock signal received from said second unit using a system clock signal for said first unit and determining a time point when said system clock is to be activated according to the monitoring result; and determining the working or protection state of said first unit, reflecting the states of said second unit and said first unit.

28. The method of claim 27, with said first unit and second unit being unit duplication boards.

29. The method of claim 27, with said step of automatically setting one of said first or second unit to a working mode further comprising of setting the other one of said first or said second units to a protection mode.

30. The method of claim 27, with said step of maintaining a reset at an initial operation being performed by a software block, said step of monitoring a clock signal being performed by a hardware block, and said step of determining the working or protection state being performed by a hardware board state block.

31. The method of claim 27, with said step of determining the working or protection state being performed by a third block, with said third block of said second unit being set to the working mode according to a reference signal when at the initial operation and maintaining activated, notifies said third block of said first unit of the activation state, and said third block of said first unit duplication board maintained deactivated notifies said third block of said working second unit of the deactivation state, said third block of said first unit determining the working or protection state of said first unit.

32. The method of claim 31, with after the automatic setting of said second unit to the working mode, each one of said first and second unit notify said central processing unit of the presence of said first and second unit duplication board so said central processing unit can access said first and second unit.

33. The method of claim 32, with said step of monitoring a clock signal being performed by a second block, with said second block of said second unit including a clock monitoring circuit determining demounting and clock fail of said first unit by directly monitoring a clock signal received from said first unit.

34. The method of claim 27, further comprising the steps of:

maintaining a reset by a first block at the initial hardware operation and determining the activation or deactivation state of said first unit according to a command received from said central processing unit;

monitoring a clock signal, by a second block, being received from said second unit using a system clock signal for said first unit and determining a time point when said system clock is to be activated according to the monitoring result; and determining the working or protection state of said first unit, by a third block, reflecting the states of said first unit and said second unit during operation.

* * * * *